US008721146B2

(12) United States Patent
Kathmann et al.

(10) Patent No.: US 8,721,146 B2

(45) Date of Patent: May 13, 2014

(54) MOTOR VEHICLE HEADLAMP

(75) Inventors: Joerg Kathmann, Salzkotten (DE); Andreas Groh, Darmstadt (DE); Ingolf Schneider, Ruesselsheim (DE); Tran Quoc Khanh, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 151 days.

(21) Appl. No.: 13/252,240

(22) Filed: Oct. 4, 2011

(65) Prior Publication Data

US 2012/0170300 A1 Jul. 5, 2012

(30) Foreign Application Priority Data

Oct. 5, 2010 (DE) ........................ 10 2010 047 376

(51) Int. Cl.

*B60Q 3/04* (2006.01)
*F21S 8/10* (2006.01)
*F21V 11/00* (2006.01)
*F21V 21/00* (2006.01)
*F21V 29/00* (2006.01)

(52) U.S. Cl.

USPC ........... 362/543; 362/544; 362/545; 362/469; 362/507

(58) Field of Classification Search

USPC ......... 362/543–545, 459–460, 464–466, 487, 362/507, 540; 257/98, E33.059, E33.072

See application file for complete search history.

(56) References Cited

U.S. PATENT DOCUMENTS 5,477,436 A * 12/1995 Bertling et al. ............... 362/545
5,975,715 A 11/1999 Bauder
6,414,437 B1 7/2002 Diez et al.
6,414,801 B1 7/2002 Roller
6,894,901 B2 5/2005 Simon
7,241,019 B1 7/2007 Tsai et al.
7,431,486 B2 10/2008 Bloemen et al.
2003/0179586 A1 9/2003 Pan
2004/0208018 A1 10/2004 Sayers et al.
2005/0156178 A1 * 7/2005 Takeda et al. .................. 257/79
2006/0087842 A1 4/2006 Alessio
2007/0025117 A1 * 2/2007 Watanabe et al. ............. 362/545

(Continued)

FOREIGN PATENT DOCUMENTS

DE 19649722 A1 6/1998
DE 19945546 A1 4/2001

(Continued)

OTHER PUBLICATIONS

German Patent Office, German Search Report for Application No. 102010047376.6, dated Oct. 5, 2010.

(Continued)

*Primary Examiner* — Nimeshkumar Patel
*Assistant Examiner* — Jose M Diaz
(74) *Attorney, Agent, or Firm* — Ingrassia Fisher & Lorenz, P.C.

(57) ABSTRACT

A motor vehicle headlamp is provided with a first array of light-emitting diodes, which are activated by a first actuation unit for a first lighting function. The headlamp also exhibits a second array of light-emitting diodes, which are activated by a second actuation unit for a second lighting function. Additionally provided is a flat printed-circuit board with conducting paths for connecting light-emitting diodes with one of the respective actuation units. The light-emitting diodes are accommodated together on one side of the printed-circuit board.

17 Claims, 6 Drawing Sheets

(56) References Cited

U.S. PATENT DOCUMENTS

| | | | | |
|---|---|---|---|---|
| 2007/0109806 | A1* | 5/2007 | Tsukamoto et al. | 362/545 |
| 2008/0007961 | A1* | 1/2008 | Mochizuki et al. | 362/465 |
| 2008/0025037 | A1 | 1/2008 | Chinniah et al. | |
| 2008/0144326 | A1* | 6/2008 | Watanabe | 362/466 |
| 2010/0290241 | A1* | 11/2010 | Tsukamoto | 362/519 |
| 2011/0141754 | A1* | 6/2011 | Hikmet et al. | 362/464 |

FOREIGN PATENT DOCUMENTS

| | | | | |
|---|---|---|---|---|
| DE | 10063876 | A1 | 7/2002 | |
| DE | 102005043058 | A1 | 3/2007 | |
| DE | 102007031934 | A1 | 2/2008 | |
| DE | 102008061747 | A1 | 6/2009 | |
| WO | WO 2009074671 | A1 * | 9/2006 | B60Q 1/08 |
| WO | 2008023313 | A1 | 2/2008 | |
| WO | 2009147036 | A1 | 12/2009 | |

OTHER PUBLICATIONS

UK IPO, British Search Report for Application No. 1116698.0, dated Jan. 27, 2012.

* cited by examiner

MOTOR VEHICLE HEADLAMP

CROSS-REFERENCE TO RELATED APPLICATION

This application claims priority to German Patent Application No. 102010047376.6, filed Oct. 5, 2010, which is incorporated herein by reference in its entirety.

TECHNICAL FIELD

The technical field relates to a vehicle headlamp. Headlamps for motor vehicles provide a plurality of lighting functions. Low beams and high beams are examples of these functions.

BACKGROUND

It is known in the art to also use light-emitting diodes in headlamps, for example instead of xenon lamps. Only a limited amount of space is available for headlamps in a motor vehicle. A headlamp with several LED's as the light source is shown in DE 10 2007 031 934 A1. It is difficult to accommodate a high enough number of light-emitting diodes in the limited space in such a way that the prescribed luminous intensity can be reached. In addition, the light-emitting diodes generate power loss, so that heat dissipation also represents a problem.

At least one object is to provide a motor vehicle headlamp that is operated by means of light-emitting diodes and exhibits enough luminous intensity. In addition, other objects, desirable features and characteristics will become apparent from the subsequent summary and detailed description, and the appended claims, taken in conjunction with the accompanying drawings and this background.

SUMMARY

A motor vehicle headlamp is provided with a first array of light-emitting diodes, which are activated by a first actuation unit for a first lighting function. The headlamp also exhibits a second array of light-emitting diodes, which are activated by a second actuation unit for a second lighting function. In addition, a printed-circuit board with conducting paths is provided for connecting light-emitting diodes with one of the respective actuation units, wherein the light-emitting diodes are accommodated together on one side of the printed-circuit board. An array of light-emitting diodes is understood as a plurality of light-emitting diodes, i.e., at least two light-emitting diodes, which are situated adjacent to each other.

The printed-circuit board has an electrically conductive substrate, and the light-emitting diodes of the first array are each connected with the substrate by at least one port. As a result, the substrate can be used as an electrical conductor, and it is possible to accommodate the light-emitting diodes of the first array on the substrate without interspersing an insulation layer. This improves the thermal conduction between the light-emitting diode and substrate, so that power loss can be better dissipated by way of the substrate.

DE 10 2007 031 934 A1 does not describe how the prescribed luminous intensity of headlamps can be reached for the low beams and high beams. Insulation layers can be provided between the light-emitting diodes of the second array and the substrate in order to insulate the ports of the light-emitting diodes of the second array. As a result, the ports of the light-emitting diodes of the second array can be activated independently of the potential of the substrate.

Copper has proven to be especially suitable as the substrate material, since it exhibits both good heat conductivity and good electrical conductivity. The actuation units and conducting paths are preferably electrically and mechanically connected with each other via plug connections, making it easy to assemble the printed-circuit board.

In an embodiment, the anode of the light-emitting diodes of the first field is electrically connected with the substrate, and the cathode of the light-emitting diodes of the first array is connected with a respective actuation circuit. As a result, the substrate can be used as a line for the high potential of a plurality of light-emitting diodes, wherein the light-emitting diodes can still be individually activated by the actuation circuits independently of each other.

In an embodiment, the light-emitting diodes contain bond pads for contacting one of the ports of the light-emitting diodes. Bond wires are provided as a connection between the bond pads and conducting paths. Bonding makes it possible to contact the light-emitting diodes on their upper side as well, so that light-emitting diodes with ports on both sides can be used. The respective first port of the light-emitting diodes of the first array advantageously exhibits a bond pad, wherein the bond pad lies on the side facing the substrate.

In an embodiment, a bond pad is also provided for the second port on the side facing the substrate. At least one of the lighting functions is advantageously from the group comprised of the low beam, high beam, cornering lamp and marker lights. This allows the headlamp to offer a plurality of lighting functions.

In an embodiment, at least one of the lighting functions is a marker light for marking obstacles appearing in front of the vehicle. For example, the latter can be used to illuminate deer or elk on the side of the road, allowing the driver to see them in time.

In another embodiment, at least one of the lighting functions provides a light that shines on objects appearing at an angle above the vehicle. This makes it possible to illuminate bridges, for example, allowing the driver to check whether the vehicle is not too high for the bridge, or whether the bridge poses some other kind of danger.

If the brightness of the light-emitting diodes of the first and second arrays can be adjusted by the actuation units, light-emitting diodes can be used for several lighting functions, or the brightness can be adjusted to the outside conditions. The brightness settings of the light-emitting diodes of the first and second arrays can here advantageously be adjusted separately and independently of each other. The template limits the illuminated surface that is imaged in the traffic area. This also makes it possible to realize a light/dark edge. The template is here at least approximately 300 μm thick.

In an embodiment, the headlamp contains a single lens for steering the light sent out by the light-emitting diodes toward the street. This enables a compact design of the headlamp, and ensures that the light source appears to the driver to be originating from the same source, even in the event of different lighting functions.

In summation, it can be said that a light source is provided that offers all lighting functions (parking lights, motorway lights, sequential cornering lamps, bad weather lights, highway lights, turning lights, bridge lights, marker lights, infrared for night vision) for an adaptive forward lighting (AFL) headlamp on one printed-circuit board with a projection lens. The LED's are here arranged in such a way that each LED can be allocated a specific solid angle. Each solid angle must in turn be allocated a specific location in the traffic area. This is enabled by imaging the LED arrangement by means of a projection lens in the traffic area. The individual channels of the metal core board are advantageously contacted by way of a plug-in card principle. All the necessary energy is preferably made available via two such plug connections. The LED's are arranged in two planes, e.g., on the metal core board. One plane is the metal substrate of the board itself, so as to enable an optimal thermal bonding.

Some of the advantages are as follows: all lighting functions are on the LED board, only a projection lens is visible from outside, a bridge light and marker light (warning against wild animals, pedestrians), various lighting functions are realized without moving mechanical parts, e.g., motors.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
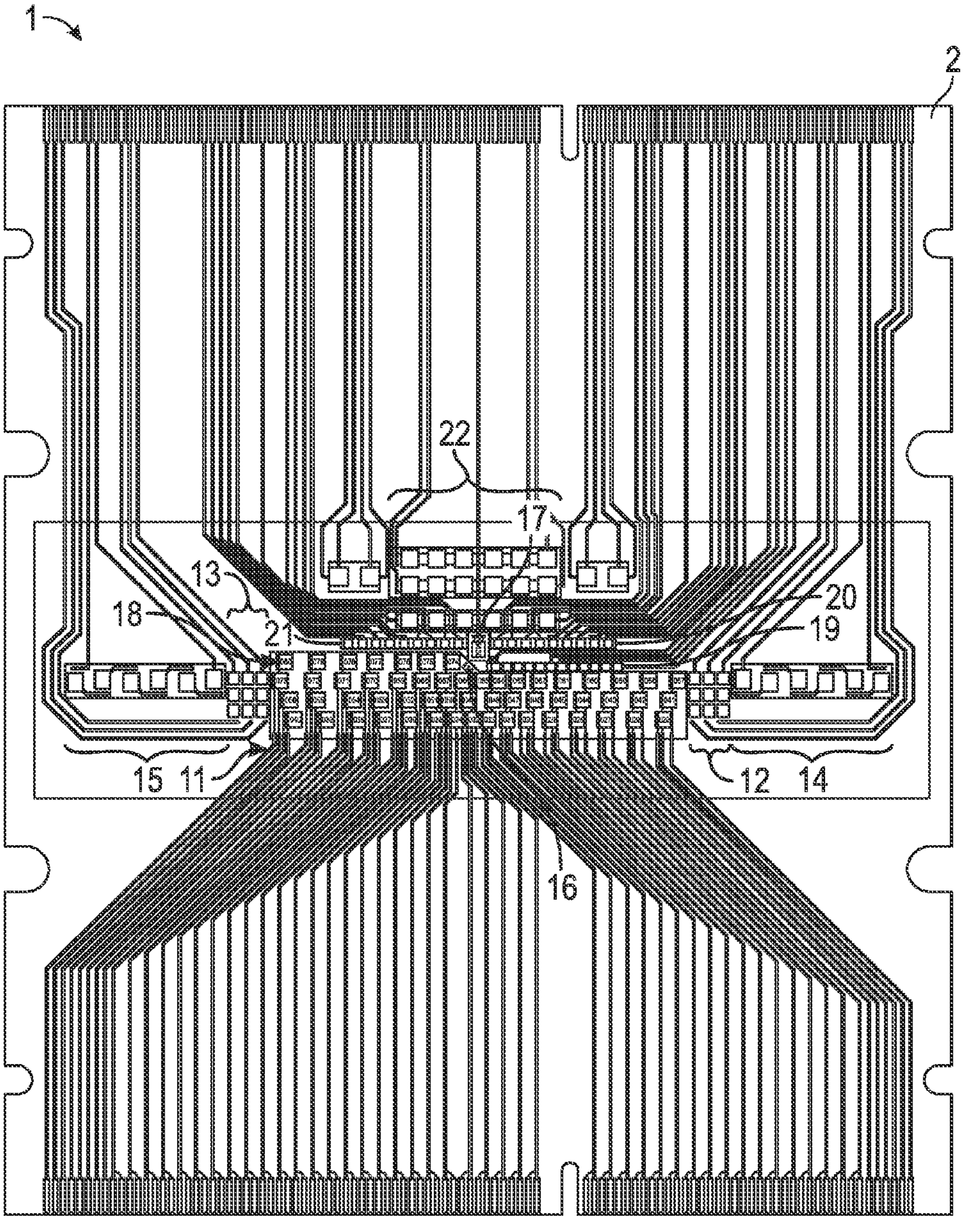
FIG. 1 is a lighting unit with a plurality of light-emitting diode arrays.

FIG. 1 shows a top view of a lighting unit having a plurality of light-emitting diode arrays. The lighting unit 1 contains a printed-circuit board 2, on which the light-emitting diodes and corresponding wiring cables are accommodated. The light-emitting diodes are characterized by squares, and located in the middle of the printed-circuit board 2.

Figure 2:
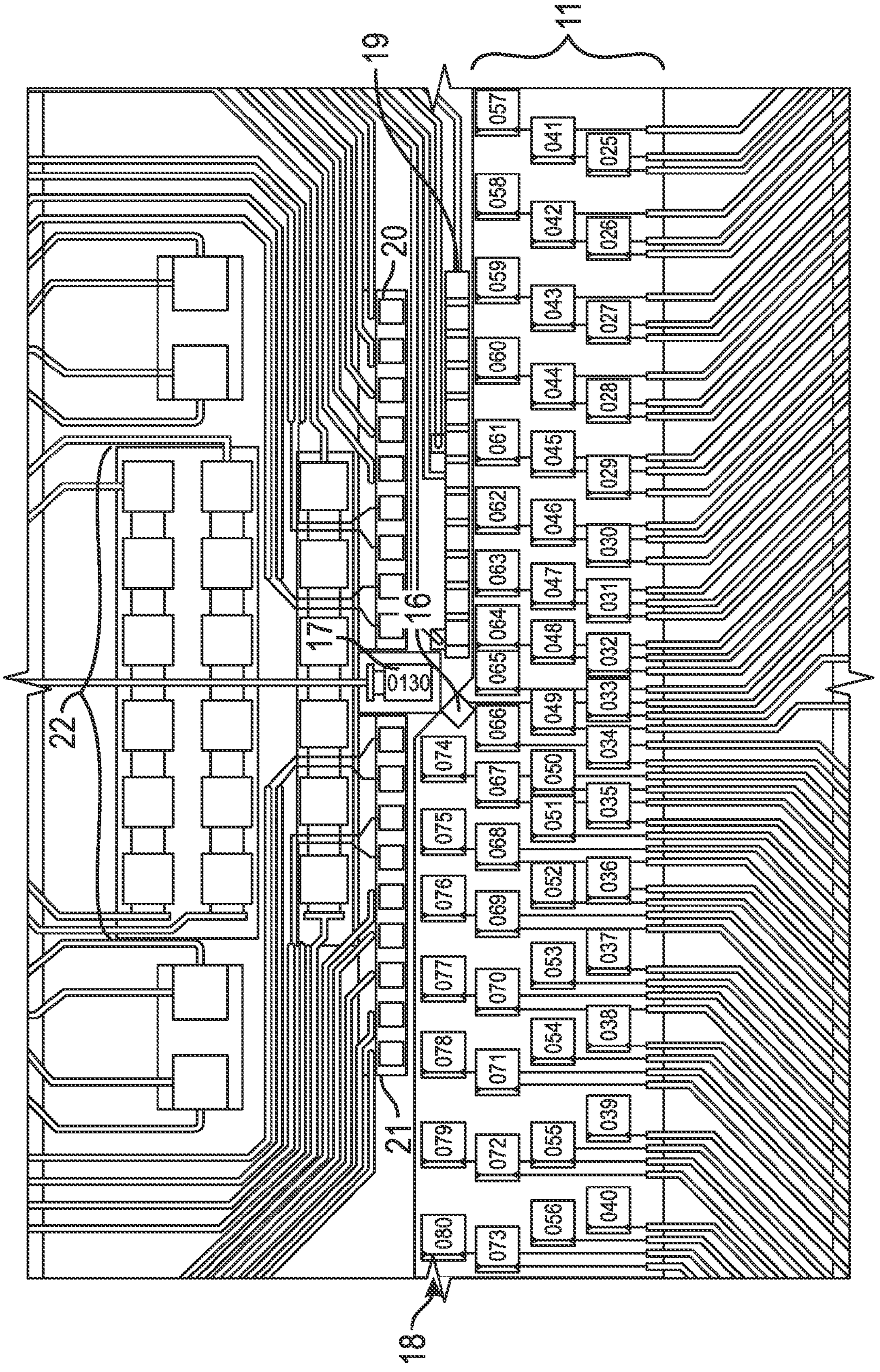
FIG. 2 is a section from FIG. 1.

FIG. 2 shows a magnified view of the middle of the printed-circuit board. The light-emitting diodes can be distinguished by their size. There are large light-emitting diodes with an edge length of approximately 0.98 mm, medium light-emitting diodes with an edge length of approximately 0.58 mm, and small light-emitting diodes with an edge length of approximately 0.28 mm. Several light-emitting diode arrays and several individual light-emitting diodes are accommodated on the printed-circuit board 2. A light-emitting diode array 11 exhibits 49 large light-emitting diodes, and is provided in the lower half and, vertically speaking, in the middle of the printed-circuit board. The light-emitting diode array 12 with 3 times 3 medium light-emitting diodes is arranged on the right of the light-emitting diode array 11. The light-emitting diode array 13 also with 3 times 3 medium light-emitting diodes is accommodated on the left of the light-emitting diode array 11. A light-emitting diode series 15 with six light-emitting diodes is provided on the left of the light-emitting diode array 13, while a light-emitting diode series 14 with six large light-emitting diodes is provided on the right side, to the right next to the light-emitting diode array 12.

Situated above the light-emitting diode array 11 is a medium light-emitting diode 16, which is rotated by 45 degrees by comparison to the light-emitting diodes of the light-emitting diode array 12. Further located above the light-emitting diode array 16 is a single, large light-emitting diode 17. A light-emitting diode series 18 of seven large light-emitting diodes is arranged to the left of the light-emitting diode 16. Twelve small light-emitting diodes 19 are accommodated to the right of the light-emitting diode 16. The light-emitting diode series 20 with nine light-emitting diodes is provided to the right of the light-emitting diodes 17, and the light emitting diode series 21 also with nine light-emitting diodes is provided to the left of the light-emitting diode 17. The light-emitting diode array 22 with six times three light-emitting diodes is provided above the light-emitting diode 17 and the light-emitting diode series 20 and 21.

When the low beam C is activated, each chip generates approximately 60 lm at a current of approximately 700 mA and temperature of approximately 100° C. This would yield a luminous flux of approximately 3420 lm at approximately 57 chips. This is why the light-emitting diodes are partially dimmed to generate the light distribution.

The light-emitting diode arrays 12 and 13 are used to illuminate the curves when cornering. The light-emitting diode series 14 and 15 are activated if the vehicle turns. The side toward which the vehicle is turning is here illuminated. An additional three times three chips are active in the case of cornering lamps. If approximately 60 lm per chip is generated at approximately 700 mA and approximately 100° C. as above, the resultant luminous flux is three times 180=540 lm.

In the case of Class E low beams, the light-emitting diode 19 is activated in addition to the light-emitting diodes that are turned on for Class C low beams. In the case of high beams, the light-emitting diode 17 is activated in addition to the light-emitting diode array 11 and light-emitting diode series 18, and the light-emitting diode array 11 and light-emitting diode series 18 are operated with a different power distribution.

The light-emitting diode series 20 and 21 can be used to mark objects at a far distance. One typical application involves marking a deer standing on the side of the road at a distance of approximately 100 m. Regardless of whether the object to be marked is standing on the right or left side of the road, individual light-emitting diodes of the two light-emitting diode series 20 or 21 are turned on. It goes without saying that several light-emitting diodes of the light-emitting diode series 20 or 21 can be activated simultaneously if several objects are to be marked. To make a bigger impression, the LED's in series 20 and 21 can be pulsed at a frequency of between 3 and 20 Hz, so that they flash at this frequency.

Figure 3:
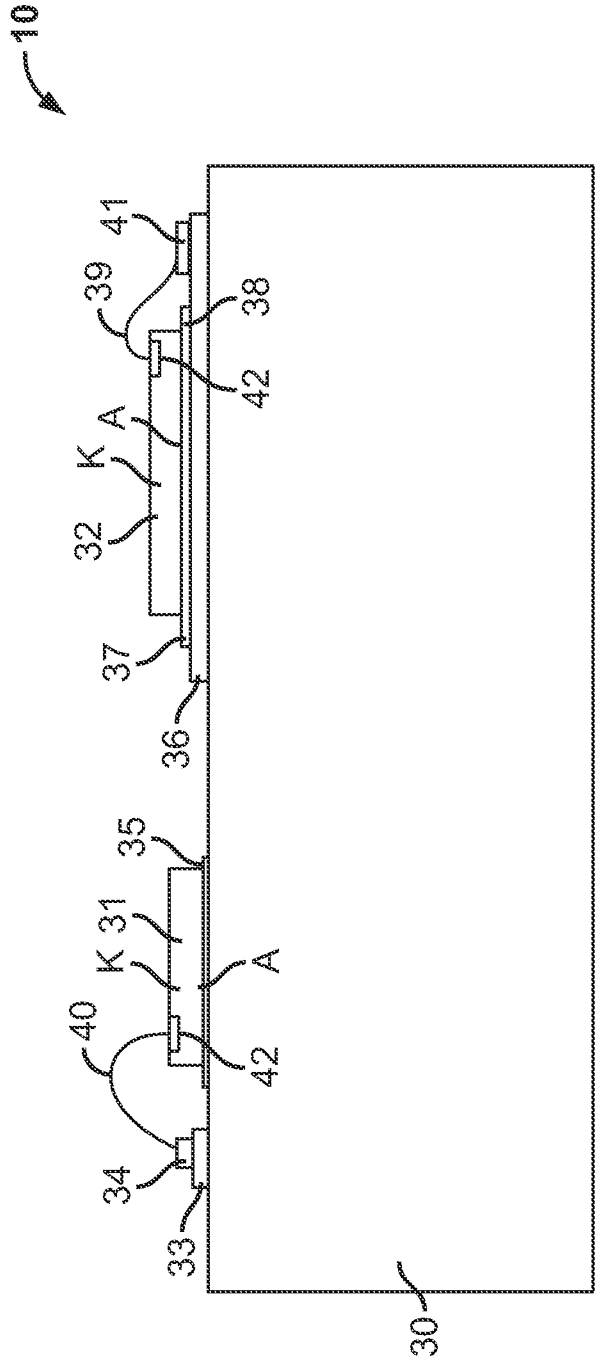
FIG. 3 is a cross section of light-emitting diodes from FIG. 1 on a substrate.

FIG. 2 shows a section from FIG. 1 on a magnified scale. FIG. 3 shows a cross section of light-emitting diodes on a shared substrate. An approximately 0.8 mm thick copper substrate 30 is provided as the lower layer, and also designated as the metal core board (IMS insulated metal substrate). A first light-emitting diode chip 31 in electrical contact with the substrate 30 is provided on the left side of FIG. 3, while a light-emitting diode chip 32 isolated from the substrate 30 is provided on the right side of FIG. 3. The light-emitting diode chip 31 lies flat on the substrate 30, wherein a conductive adhesive is provided between the light-emitting diode chip 31 and the substrate 30. A conducting path 34 separated from the substrate 30 by insulation 33 is provided on the left of the light-emitting diode chip 31.

The copper substrate is approximately 800 μm thick, while the light-emitting diode chip 31 is approximately 100 μm thick. The insulation layer 33 is approximately 75 μm thick, the conductive adhesive 35 is approximately 10 μm thick, and the conducting path 34 is approximately 35 μm thick. The light-emitting diode chips 31 exhibit a cathode on one side, and an anode on the other side.

The bottom anode of the light-emitting diode chip 31 is connected with a substrate 30, while the top anode exhibits a bond pad 42 joined with the conducting path 34 by way of a bond wire 40. The bond pad lying opposite the substrate is hence connected with the substrate. The copper substrate is connected with a high potential, or 12 V, while the conducting path 34 is connected with a constant current source. This constant current source is turned on when the light-emitting diode of the light-emitting diode chip 31 is to light up. The current then flows from the positive pole of the vehicle battery through the substrate 30, the conductive adhesive 35, the light-emitting diode chip 31, the bond wire 40, the conducting path 34 and the constant current source to the earth terminal of the vehicle battery.

Shown on the right side of FIG. 3 is a layer sequence with substrate 30, insulation 36, conducting path 37, conductive adhesive 38 and light-emitting diode chip 32. Also provided is an additional conducting path 41. The anode of the light-emitting diode chip 32 lies below, and is connected with the conducting path 37 via the conductive adhesive 38. The cathode of the light-emitting diode chip 32 lies above, and exhibits a bond pad 42 connected with the conducting path 41 via a bond wire 39. The light-emitting diode 32 is activated from a constant current source via the conducting paths 37 and 41, so as to be turned on and off as needed.

The insulation layer 36 is 75 μm thick, the conducting paths 37 and 41 are 35 μm thick, the conductive adhesive 38 is approximately 10 μm thick, and the light-emitting diode 32 is approximately 100 μm thick. The bond wires 40 and 41 each have a diameter of approximately 33 μm.

A majority of the large light-emitting diodes are provided directly on the substrate, just like light-emitting diode 31, so that they not only consume the electric current, but also absorb and dissipate heat. Copper is a good heat conductor. The heat can be dissipated by applying the substrate 30 onto a heat sink. The LED arrangement accommodates a total of 136 LED's, which are actuated via 89 channels to generate a wide variety of light distributions.

The board 2 is essentially mounted perpendicular to the longitudinal axis of the vehicle. The substrate is screwed to a heat sink for assembly purposes. Crossbeams are then inserted at the top and bottom part of the substrate. The board is mounted perpendicularly. The plug connection joins the conducting paths of the printed-circuit board with the conducting paths of the crossbeams. In an embodiment not depicted on the figures, bond pads for both the cathode and anode are located on the bottom sides of the light-emitting diode chips 31, so that the chips do not have to be bonded from above.

Figure 4:
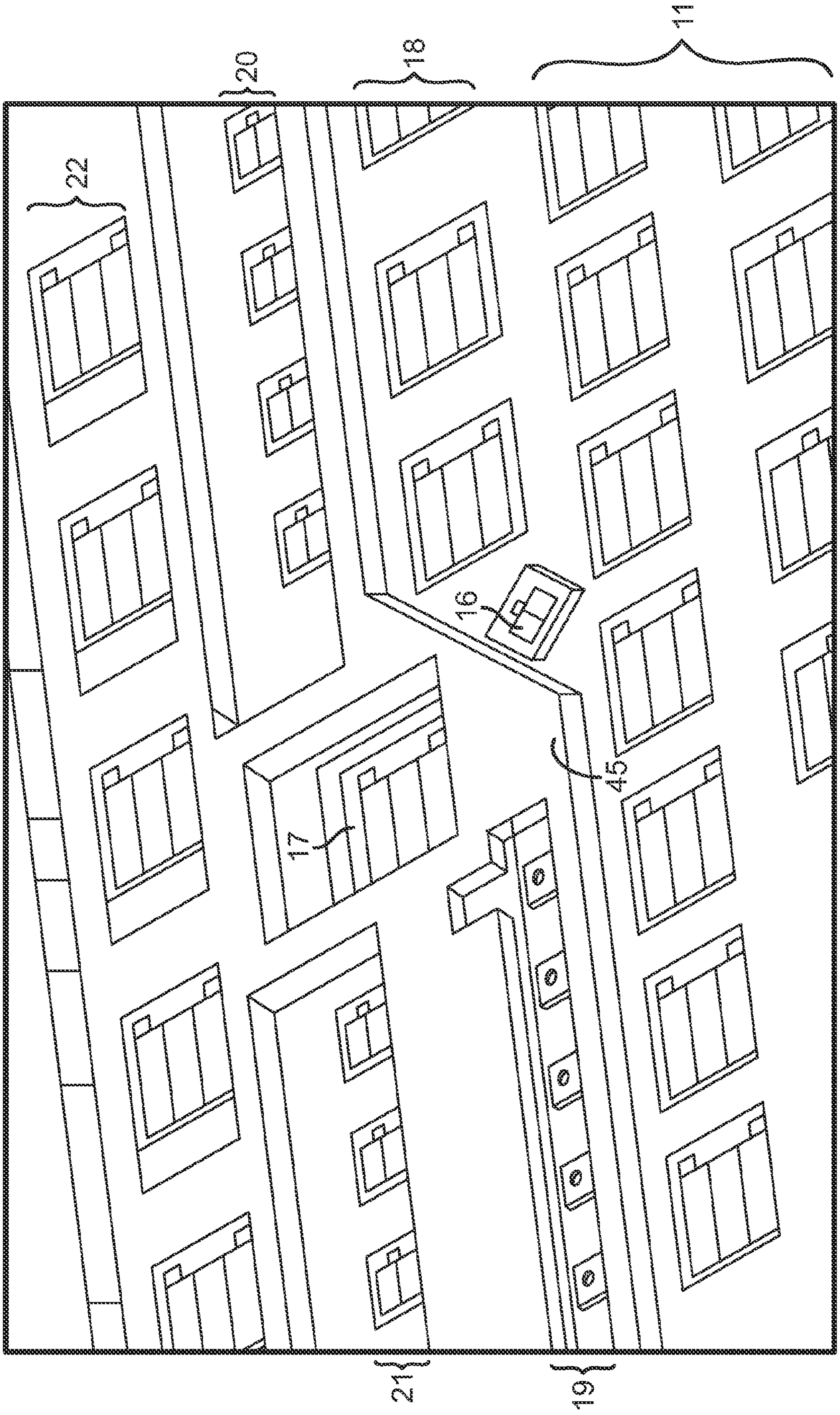
FIG. 4 is a section from the light-emitting diode arrays according to FIG. 1.

FIG. 4 shows the lighting device from FIG. 1 as viewed at an inclination from above. Several light-emitting diodes are applied in part directly to the substrate 30, while other light-emitting diodes are applied to insulation lying on the substrate. A template 45 is used to delineate the illuminated surface imaged via the projection lens in the traffic area.

Figure 5:
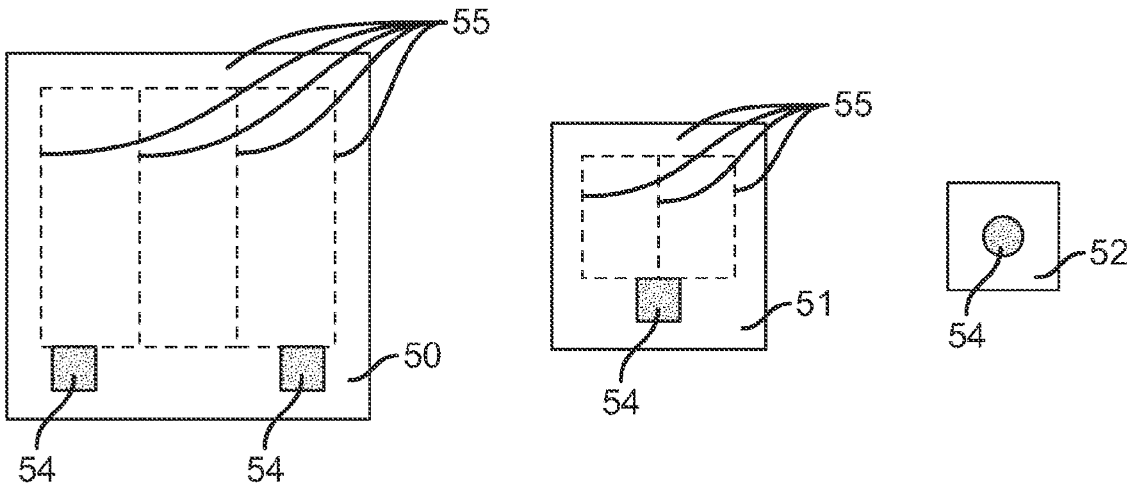
FIG. 5 is a comparison of light-emitting diodes of varying size.

The board has dimensions of approximately 66 mm times approximately 80 mm, where the maximum expansion of the light-emitting diodes measures approximately 60 mm times approximately 14 mm. FIG. 5 presents a view from above comparing the sizes of large, medium and small light-emitting diodes. In this top view, the light-emitting diodes appear square in shape. The large light-emitting diode 50 has edge lengths of 980 μm, and exhibits two bonding islands 54. A lattice of six conducting paths 55 covers the light-emitting diode 50.

The medium light-emitting diode 51 has edge lengths of approximately 580 μm. The light emitting diode 51 exhibits one bonding island to the side of the actual light-emitting diode. The light-emitting diode 51 is covered by five conducting paths, which are also electrically connected with the bonding island 55. The light-emitting diode 52 has edge lengths of approximately 280 μm. A bonding island 5 is secured in the middle of the light-emitting diode, and other conducting paths are not provided on the upper side of the light-emitting diode 53.

The medium light-emitting diode 51 has edge lengths of approximately 580 μm. The light emitting diode 51 exhibits one bonding island 54 to the side of the actual light-emitting diode. The light-emitting diode 51 is covered by five conducting paths 55, which are also electrically connected with the bonding island 54. The light-emitting diode 52 has edge lengths of approximately 280 μm. A bonding island 54 is secured in the middle of the light-emitting diode, and other conducting paths are not provided on the upper side of the light-emitting diode 52.

Figure 6:
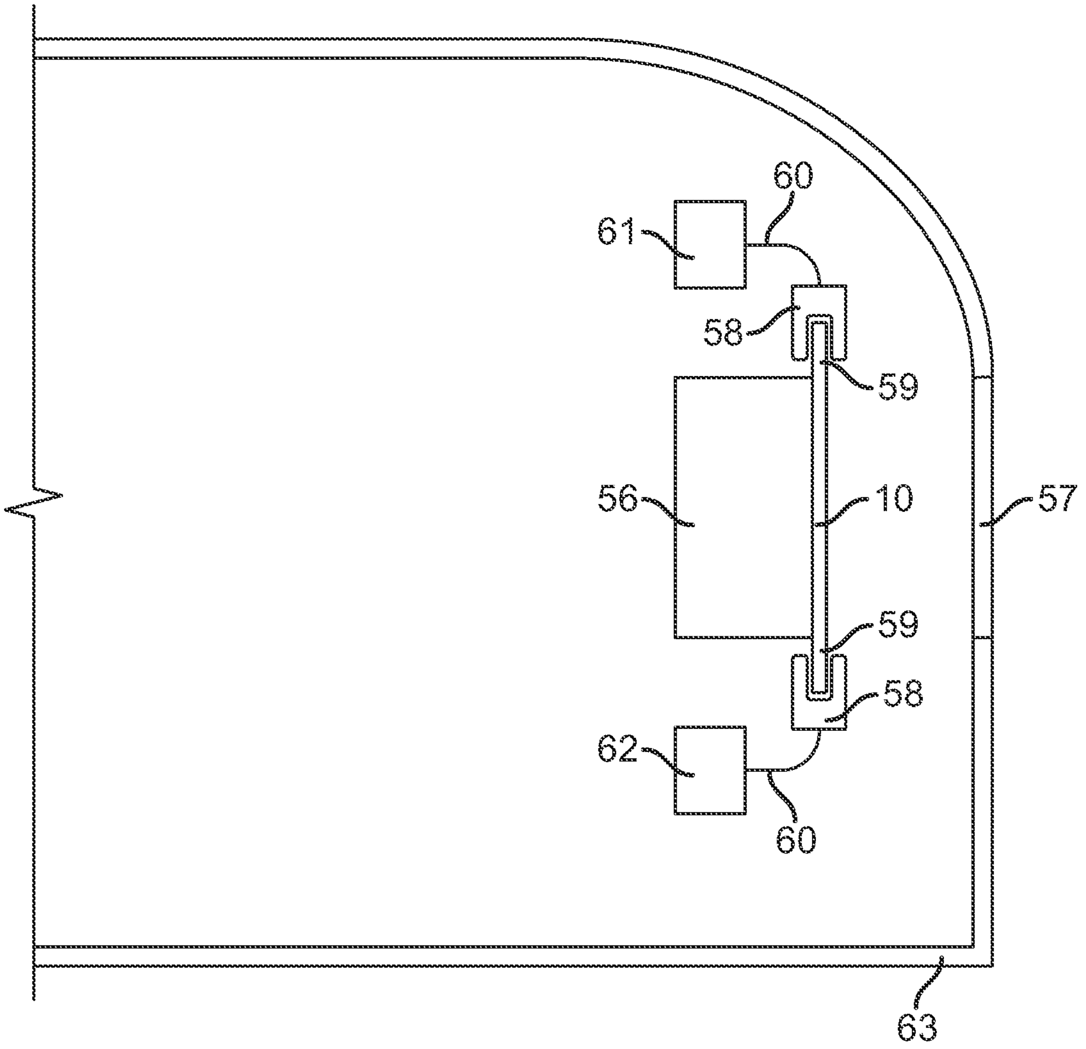
FIG. 6 is a headlamp according to an embodiment.

FIG. 6 presents a sectional view of a headlamp to be mounted in the front of a vehicle. The headlamp contains a housing 63, which incorporates the printed-circuit board 10, two plugs 58, a heat sink 56, two cables 60, a first actuator unit 61 and a second control unit 62. One side of the printed-circuit board 10 is applied to a heat sink, for example by means of screws or an adhesive bond. Applied to the second side of the printed-circuit board 10 are light-emitting diodes and conducting paths, which are not shown on FIG. 6 for reasons of clarity. Conducting paths 59 of the printed-circuit board 10 are exposed, and contacted by way of the plugs 58. In addition, the plugs 58 are used to contact the substrate lying on the side of the printed-circuit board 10 facing the heat sink with the high potential, for example approximately 12 V. The plugs are each connected by cables 60 with either the first actuator unit 61 or second actuator unit 62. The first and second actuator units can also be realized together on a single component or several components. The actuator units 61 and 62 activate the array of light-emitting diodes they respectively actuated, so that the light-emitting diodes light up with a desired brightness. The light is bundled by a lens 57 integrated into the housing 63 and cast onto the street or obstacles on or over the street.

What is claimed is:

1. A motor vehicle headlamp comprising:

a first array of light-emitting diodes activated by a first actuation unit for a first lighting function;

a second array of light-emitting diodes activated by a second actuation unit for a second lighting function;

a plurality of light-emitting diodes;

a printed-circuit board with conducting paths configured to connect light-emitting diodes with one of the first actuation unit and the second actuation unit; and a template configured to limit an illuminated surface and generating an edge, wherein the light-emitting diodes are accommodated on one side of the printed-circuit board, wherein the printed-circuit board comprises an electrically conductive substrate, and wherein the light-emitting diodes of a first array are each connected with the electrically conductive substrate by a port.

2. The motor vehicle headlamp according to claim 1, further comprising an insulation layer between the light-emitting diodes of a second field and the electrically conductive substrate in order to insulate the port of the light-emitting diodes of a second array.

3. The motor vehicle headlamp according to claim 1, wherein the light-emitting diodes comprise bond pads configured to contact one of the port of the light-emitting diodes, and further comprising bond wires configured as a connection between bonding islands and the conducting paths.

4. The motor vehicle headlamp according to claim 1, wherein a respective first port and a second port of the light-emitting diodes of the first array have bond pads are provided on the side of the light-emitting diodes of the first array opposite the electrically conductive substrate.

5. The motor vehicle headlamp according to claim 1, wherein the template is at least approximately 300 μm thick.

6. A motor vehicle headlamp comprising:

a first array of light-emitting diodes activated by a first actuation unit for a first lighting function;

a second array of light-emitting diodes activated by a second actuation unit for a second lighting function;

a plurality of light-emitting diodes; and a printed-circuit board with conducting paths configured to connect light-emitting diodes with one of the first actuation unit and the second actuation unit, wherein the light-emitting diodes are accommodated on one side of the printed-circuit board, wherein the printed-circuit board comprises an electrically conductive substrate, wherein the light-emitting diodes of a first array are each connected with the electrically conductive substrate by a port, wherein a lighting function is a marker light for marking obstacles appearing in front of a vehicle, and wherein the light-emitting diodes are configured to flash at a frequency ranging between approximately 3 and approximately 20 Hz.

7. A motor vehicle headlamp, comprising:

a printed-circuit board comprising an electrically conductive substrate;

a first array of light-emitting diodes activated by a first actuation unit for a first lighting function, wherein each of the light-emitting diodes in the first array has an anode electrically connected with the electrically conductive substrate, and has a cathode connected with the first actuation unit;

a second array of light-emitting diodes activated by a second actuation unit for a second lighting function, wherein each of the light-emitting diodes in the second array has an anode electrically connected with a conducting path other than the electrically conductive substrate, and has a cathode connected with the second actuation unit; and an insulation layer between the substrate and the conducting path of each of the light-emitting diodes in the second array in order to insulate each of the light-emitting diodes in the second array from the electrically conductive substrate;

wherein the light-emitting diodes are accommodated on one side of the printed-circuit board.

8. The motor vehicle headlamp according to claim 7, wherein the electrically conductive substrate comprises copper.

9. The motor vehicle headlamp according to claim 7, wherein the first actuation unit, the second actuation unit and the conducting paths are electrically and mechanically connected with plug connections.

10. The motor vehicle headlamp according to claim 7, wherein a lighting function is a low beam function.

11. The motor vehicle headlamp according to claim 7, wherein a lighting function is a high beam function.

12. The motor vehicle headlamp according to claim 7, wherein a lighting function is a cornering lamp function.

13. The motor vehicle headlamp according to claim 7, wherein a lighting function is a marker light function.

14. The motor vehicle headlamp according to claim 7, wherein a lighting function is a marker light for marking obstacles appearing in front of a vehicle.

15. The motor vehicle headlamp according to claim 7, wherein a lighting function comprises a light that shines on obstacles appearing at an inclination from above a vehicle.

16. The motor vehicle headlamp according to claim 7, wherein brightness settings of individual light-emitting diodes of the first array and the second array are separately and independently adjustable with the first actuation unit and the second actuation unit.

17. The motor vehicle headlamp according to claim 7, wherein the electrically conductive substrate is applied to a heat sink.

* * * * *